US006886133B2

(12) United States Patent
Bailey et al.

(10) Patent No.: US 6,886,133 B2
(45) Date of Patent: Apr. 26, 2005

(54) INTERACTIVE FORMATTING INTERFACE

(75) Inventors: Eric D Bailey, Redmond, WA (US); Roberto C. Taboada, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 716 days.

(21) Appl. No.: 09/876,489

(22) Filed: Jun. 7, 2001

(65) Prior Publication Data

US 2002/0188637 A1 Dec. 12, 2002

(51) Int. Cl.[7] .......................... G06F 17/00; G06F 17/18
(52) U.S. Cl. ........................ 715/531; 715/529; 707/4
(58) Field of Search ................................. 715/531, 529; 707/4, 100; 345/467

(56) References Cited

U.S. PATENT DOCUMENTS

| 5,579,466 A | * | 11/1996 | Habib et al. | 715/529 |
| 5,694,610 A | * | 12/1997 | Habib et al. | 715/531 |
| 5,778,359 A | * | 7/1998 | Stent | 707/4 |
| 6,016,492 A | * | 1/2000 | Saxton et al. | 707/100 |
| 6,411,299 B1 | * | 6/2002 | Stoval et al. | 345/467 |

OTHER PUBLICATIONS

*Automated consistency checking of requirements specifications*; Constance L. Heitmeyer, Ralph D. Jeffords and Bruce G. Labaw; ACM Trans. Softw. Methodol. 5, 3(Jul. 1996) p. 231–261.

*Text formatting by demonstration*; Brad A. Myers; Human factors in computing systems conference proceedings on reaching through technology (1991) p. 251–256.

*Visual discriminability of headings in text*; T.R. Williams and J.H. Spyridakis; IEEE Transactions of Professional Communications, v.35, n.2 (Jun. 1992) p. 64–70.

*Software review—Wordperfect 4.1*; T. Williams; Research in word processing newsletter, v.4, n.4 (Apr. 1986) p. 18–23.

\* cited by examiner

Primary Examiner—Sanjiv Shah
(74) Attorney, Agent, or Firm—Merchant & Gould

(57) ABSTRACT

An interactive formatting tool enables a user to analyze and modify the formatting properties that have been applied to a text string. A user can invoke the formatting tool by displaying an Interactive Formatting Pane and then selecting a text string for analysis. The Interactive Formatting Pane will display all formatting properties applied to the text selection, including font properties, paragraph properties, and section properties. The Interactive Formatting Pane may also display table format properties, frame format properties, cell format properties and bullets and numbering format properties, if applicable. The user may then select a formatting category (e.g., font size) from the Interactive Formatting Pane and a format modification dialog will be displayed. The format modification dialog enables the user to modify the formatting properties associated with the selected formatting category. The Interactive Formatting Pane also includes a compare selection checkbox. The Interactive Formatting Pane will highlight the formatting differences between the selections. The user may then select each highlighted difference and reconcile the formatting properties of the two selections.

18 Claims, 8 Drawing Sheets

INTERACTIVE FORMATTING INTERFACE

FIELD OF THE INVENTION

The present invention generally relates to formatting text in an electronic document. More particularly, the present invention relates to providing an interactive formatting interface to enable the facile analysis and modification of text formatting in a document.

BACKGROUND OF THE INVENTION

Quick and easy text formatting is one of the great advantages provided by modern word processors. Modem word processors enable a user to readily format and re-format text in an electronic document. Many different individual formatting properties (e.g., bold, italic, underline, font color, font size) can be applied to a single text string. Moreover, a virtually unlimited number of formatting sets (i.e., grouped formatting properties) can be applied to various text strings throughout a document.

Another innovation of modern word processors is the formatting style. Formatting styles are simply named formatting sets that can be applied to text. Thus, instead of selecting a text string and directly applying formatting properties to the text string, one at a time, a user can select the text and then apply all of the formatting properties in the style in a single action.

Unfortunately, it is easy for a user to lose track of which formatting properties have been applied to a particular text string. Once applied, it can be difficult to determine which formatting properties have been applied to the text string. In addition, the formatting tools described above make it easier for a user to inadvertently apply formatting properties inconsistently between two text strings.

Some word processors provide a reveal formatting tool for displaying the formatting properties of a particular text string in a document. In some such word processors, the formatting tool can identify the formatting properties of the text string, but does not provide an easily navigable user interface for modifying those formatting properties. Conventional formatting tools do not identify the formatting style associated with the text string (if any) and do not permit a user to quickly determine the formatting differences between two text strings. In addition, conventional formatting tools change the display state of the document, when the formatting tool is invoked. The displayed document is changed from a what-you-see-is-what-you-get (WYSIWYG) type display to a display containing the formatting codes embedded within the document itself. As a result, such formatting tools can be confusing and inconvenient for users.

Therefore, there is a need in the art for a formatting tool that enables a word processor user to determine all of the formatting properties that have been applied to a particular text string and to directly modify those formatting properties, as needed. The formatting tool should identify any formatting styles associated with the text string. The formatting tool also should enable the user to determine whether two text strings are inconsistently formatted and assist the user to reconcile any undesired inconsistencies.

SUMMARY OF THE INVENTION

The present invention solves the above-identified problems by providing a formatting tool that enables a user to analyze and modify the formatting properties that have been applied to a text string. A user can invoke the formatting tool by displaying an Interactive Formatting Pane and then selecting a text string for analysis.

The Interactive Formatting Pane will display all formatting properties applied to the text selection, including font properties, paragraph properties, and section properties. The Interactive Formatting Pane may also display table format properties, frame format properties, cell format properties and bullets and numbering format properties, if applicable. The user may then select a category (e.g., font size) from the Interactive Formatting Pane and a format modification dialog will be displayed. The format modification dialog enables the user to modify the formatting properties associated with the selected formatting category.

The Interactive Formatting Pane also includes a compare selection checkbox. When the compare selection checkbox is selected, the Interactive Formatting Pane will provide two sub-panes for comparing the formatting properties of two text selections. The Interactive Formatting Pane will highlight the formatting differences between the selections. The user may then select each highlighted difference and reconcile the formatting properties of the two selections.

The Interactive Formatting Pane has a Selected Text Window that can display a fully formatted preview of the selected string. If empty space or a non-textual element has been selected, the Selected Text Window will display the string "Sample Text" and the formatting of the selection will be applied to the string. The Selected Text Window also has a drop-down menu that permits the user to perform various functions associated with the formatting of the selected text. The user may select all other text in the document with similar formatting. The user may apply the formatting of adjacent text to the selected text. Finally, the user may clear all formatting associated with the selected text (i.e., revert the formatting of the selection to a default format set).

The formatting properties displayed in the Interactive Formatting Pane also can be divided into groups, depending on whether the formatting properties are the result of direct formatting or the result of an applied style. Additionally, the Interactive Formatting Pane can display all other formatting symbols in the selection, such as paragraph markers, hidden text, etc.

The various aspects of the present invention may be more clearly understood and appreciated from a review of the following detailed description of the disclosed embodiments and by reference to the drawings and claims.

DETAILED DESCRIPTION

In an exemplary embodiment of the present invention, a formatting tool is provided that enables a user to analyze and modify the formatting properties that have been applied to a text string. A user can invoke the formatting tool by displaying an Interactive Formatting Pane and then selecting a text string for analysis. The Interactive Formatting Pane displays all formatting properties applied to the text selection, including font properties, paragraph properties, and section properties. The Interactive Formatting Pane may also display table format properties, frame format properties, cell format properties and bullets and numbering format properties, if applicable. The user may then select a category (e.g., font size) from the Interactive Formatting Pane and a new format modification dialog will be displayed. The new dialog enables the user to modify the formatting properties associated with the selected formatting category.

The Interactive Formatting Pane of an exemplary embodiment of the present invention also includes a compare selection checkbox. When the checkbox is selected, the Interactive Formatting Pane will provide two sub-panes for comparing the formatting properties of two text selections. The Interactive Formatting Pane will highlight the formatting differences between the selections. The user may then select each highlighted difference and reconcile the formatting properties of the two selections.

The Interactive Formatting Pane of an exemplary embodiment of the present invention has a Selected Text Window that can display a fully formatted preview of the selected string. The Selected Text Window also has a drop-down menu that permits the user to perform various functions associated with the formatting of the selected text. The user may select all other text in the document with similar formatting. The user may apply the formatting of adjacent text to the selected text. Finally, the user may clear all formatting associated with the selected text (i.e., revert the formatting of the selection to a default format set). The formatting properties displayed in the Interactive Formatting Pane also can be divided into groups, depending on whether the formatting properties are the result of direct formatting or the result of an applied style.

An Exemplary Operating Environment

Figure 1:
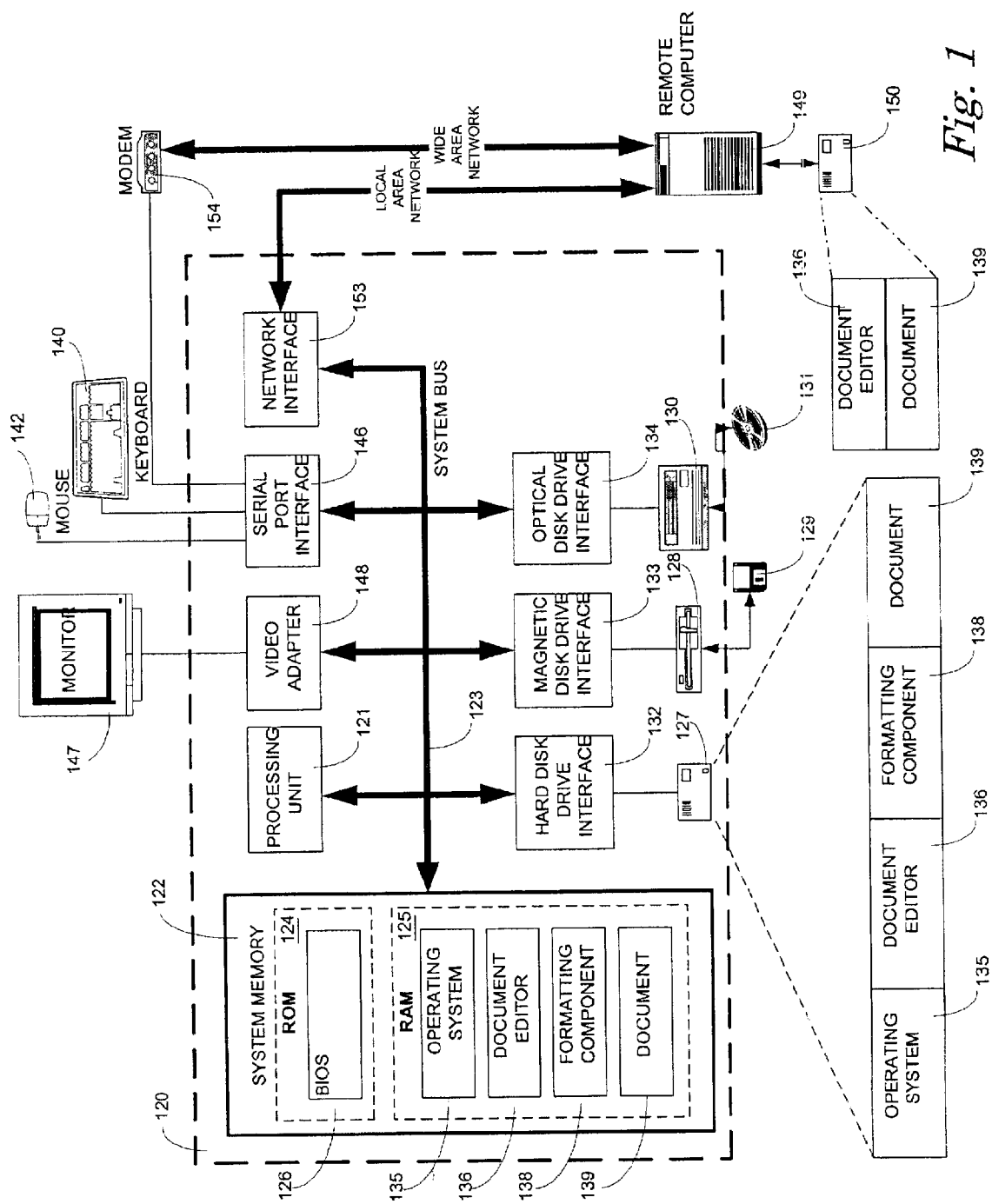
FIG. 1 is a block diagram illustrating an exemplary operating environment for implementation of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, a document editor 136, a formatting component 138, and a document 139. Program modules include routines, sub-routines, programs, objects, components, data structures, etc., which perform particular tasks or implement particular abstract data types. Aspects of the present invention may be implemented in the form of a formatting component 138 that can be incorporated into or otherwise in communication with the document editor 136 and the document 139. The document editor 136 generally comprises computer-executable instructions for creating or modifying an electronic document. The formatting component 138 generally comprises computer-executable instructions for applying and modifying formatting to text and/or other document elements. The formatting component 138 is generally accessible to the document editor 136, but can also be implemented as an integral part of the document editor.

A user may enter commands and information into personal computer 120 through input devices, such as a keyboard 140 and a pointing device 142. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in the figure. The logical connections depicted in the figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
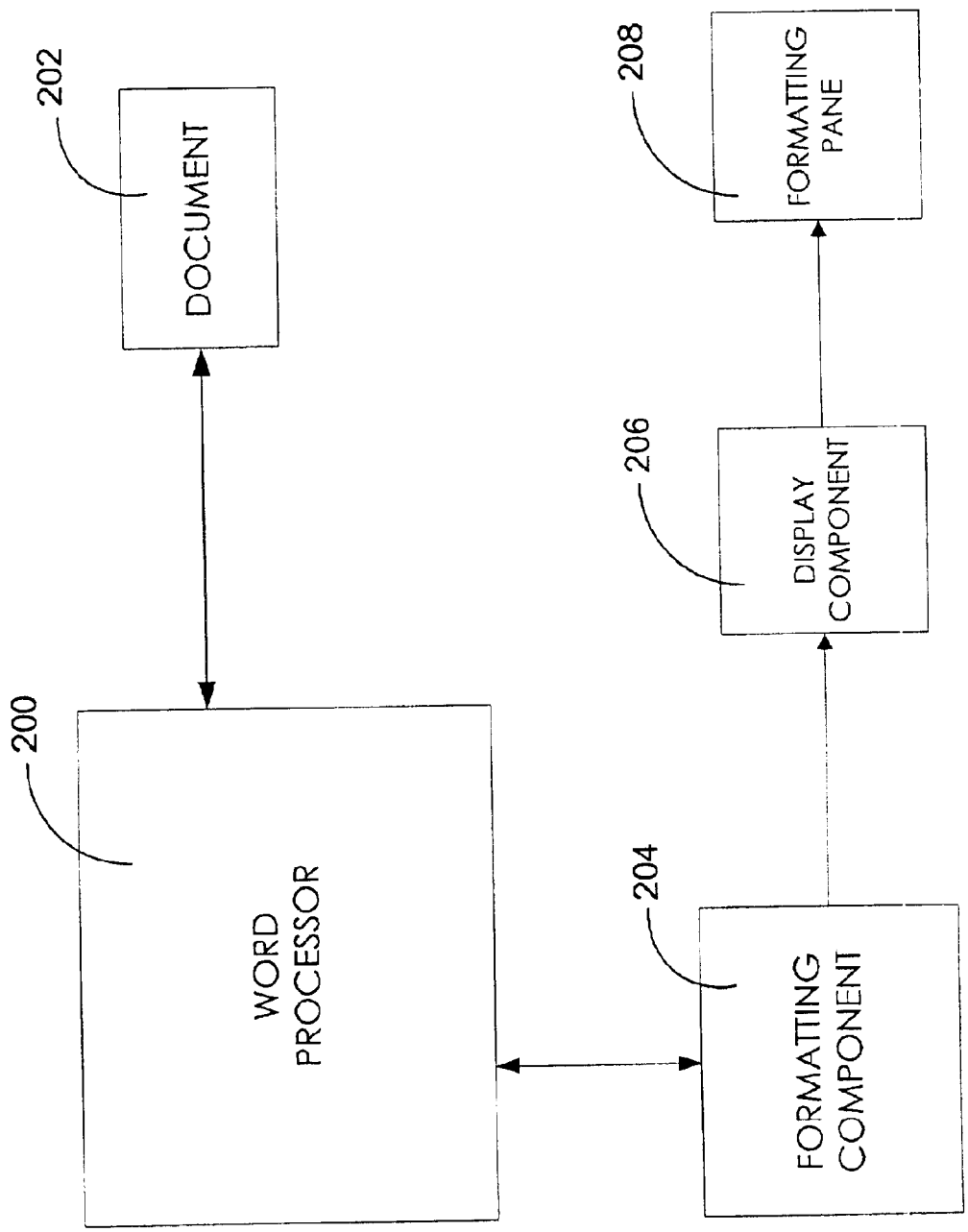
FIG. 2 is a block diagram depicting an exemplary formatting component operating within the context of a word processor document editor.

FIG. 2 is a block diagram depicting an exemplary formatting component 204 operating within the context of a word processor 200. In this exemplary embodiment of the present invention, the word processor 200 is a document editor that can be used to create and manipulate a document 202. The formatting component 204 works in cooperation with the word processor 200 to provide formatting tools for the document 202. The formatting component 204 can maintain information about the document 202 including, but not limited to, information about text formatting.

Text formatting is typically applied to text in the document 202 aft<as a style or as a direct formatting property. Styles are simply named collections of formatting properties. For example, a "Body Text" style may include the formatting properties, font: Times Roman, Font size: 12 points, Bold: no, Alignment: justified; while a "Headline" style may include the formatting properties, Font: Arial, Font size: 20, Bold: yes. The styles may be applied to text, thereby formatting the text in accordance with the formatting properties that are members of the named formatting set (i.e., the style).

Of course, each formatting property can be individually applied to text. Individualized application of formatting properties to text is referred to as direct formatting. Text may be formatted identically through direct formatting or through the application of a style. However, style application is generally an easier way to apply formatting properties to the text within a document. Moreover, styles are used to verify formatting consistency among portions of a document that have the same style applied to them. Changes to the collection of formatting properties in a style will simultaneously change the format of all text to which that style is applied. The formatting component 204 of an exemplary embodiment of the present invention maintains a record of the formatting properties associated with each portion of the document 202, while the document is being edited. Typically all of a document's formatting properties are stored with the document, when the document is not being edited.

Advantageously, the formatting component 204 of an exemplary embodiment of the present invention provides an interactive formatting pane 208. The interactive formatting pane 208 enables the display of interactive formatting properties and styles associated with portions of the document 202. The interactive formatting pane 208 also enables the modification of previously applied formatting properties and styles as well as the addition and/or deletion of formatting properties and styles. The formatting component 204 provides the formatting information to a display component 206 that renders the interactive formatting pane 208 as an interactive user interface.

The display component 206 populates the interactive formatting pane 208 with the formatting information as well as hyperlinks that allow a user to interact with the interactive formatting pane 208 to modify the formatting in the document 202. When the user selects a hyperlink in the interactive formatting pane 208, a dialog box (not shown) can be provided to allow the user to change the selected formatting property. The user's selections are then transferred back to the formatting component 204, which makes the appropriate formatting changes to the document 202. The formatting change also can result in a change in the way that the word processor 200 displays the document 202 to the user.

Figure 3:
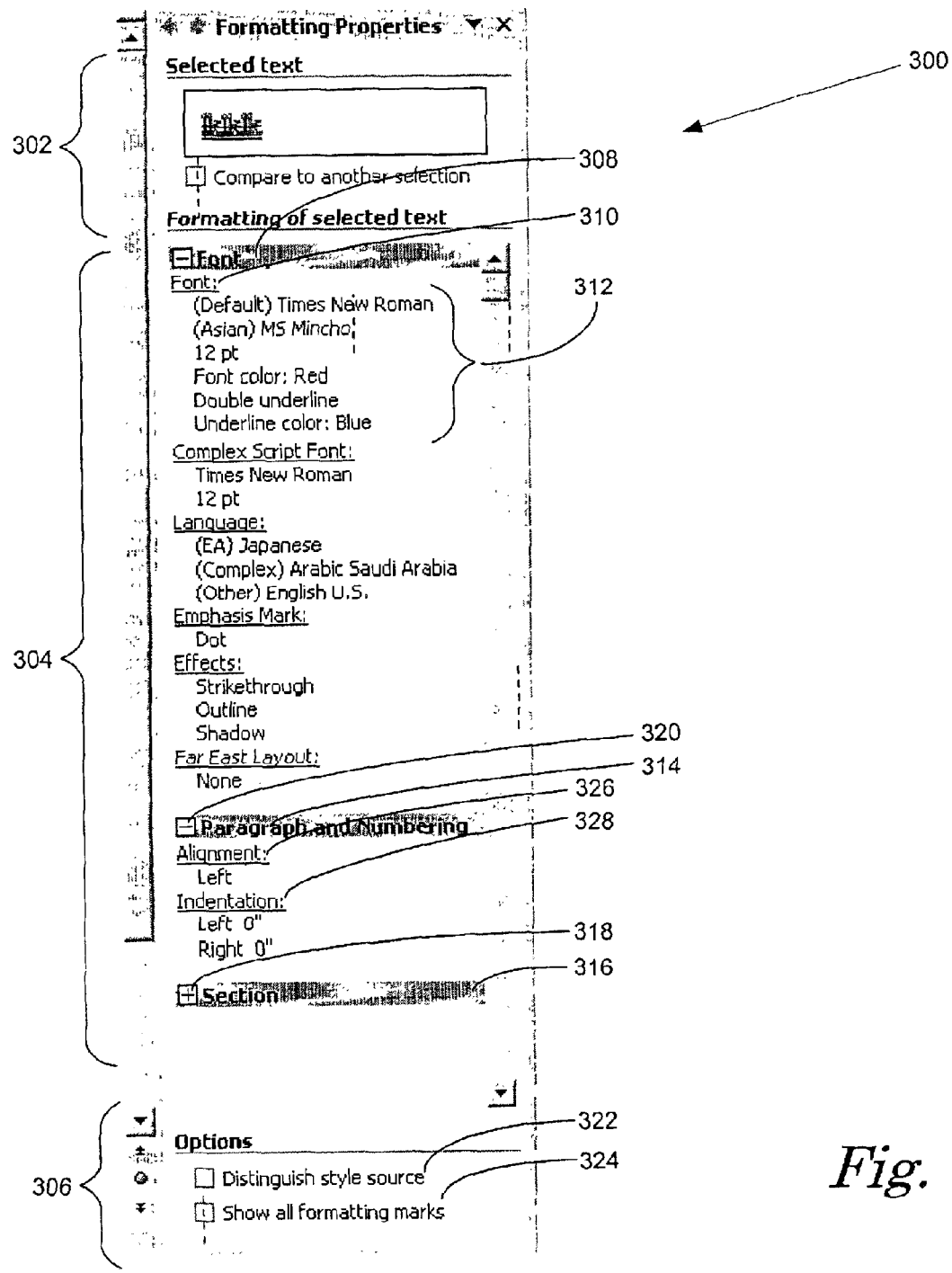
FIG. 3 depicts an interactive formatting pane that is an exemplary embodiment of the present invention.

FIG. 3 depicts an interactive formatting pane that is an exemplary embodiment of the present invention. The interactive formatting pane 300 is composed primarily of three components.

The first component is the selected text window 302. The selected text window 302 provides a display of the selected text as that text will be displayed and/or printed, according to the formatting properties applied thereto. The selected text window 302 also includes a check box that enables the user to compare the formatting of the selected text with the formatting of another selection. The functionality of the checkbox will be discussed in more detail in connection with FIG. 5.

The second component of the interactive formatting pane 300 is the interactive formatting window 304. The interactive formatting window 304 includes formatting categories 308, 314, 316 and formatting properties 310. In the exemplary interactive formatting window 304 of FIG. 3, a Font category 308, a Paragraph and Numbering category 314, and a Section category 316 are displayed. Those skilled in the art will appreciate that fewer or more formatting categories could be displayed in the interactive formatting window 304. The formatting properties associated with each formatting category can be displayed or hidden. For example, the minus box 320 displayed next to the Paragraph and Numbering category 314 can be selected to cause the formatting properties 326, 328 associated with the Paragraph and Numbering category 314 to be hidden. Conversely, the plus box 318 associated with the Section category 316 can be selected to display the formatting properties associated with the Section category.

The interactive formatting window 304 is interactive to the extent that it can be used to modify the formatting of the selected text. For example, the Font formatting property 310 can be selected to modify the Font formatting property's characteristics 312. If, for example, a user decides to change the underline color from blue to red, the user may select the Font formatting property 310. This selection will open a dialog box that will enable the user to make the desired modification. The Font formatting property 310 is rendered as a hyperlink in the example of FIG. 3. However, those skilled in the art will appreciate that other means of user interactivity could be enabled within the scope of the present invention.

Another section of the exemplary interactive formatting pane 300 is the options window 306. The options window provides controls that allow the user to select various formatting tools. In the example of FIG. 3, a Distinguish Style Source checkbox 322 and a Show All Formatting Marks checkbox 324 are provided. The Distinguish Style Source checkbox 322 can be selected to modify the interactive formatting window 304 by dividing the formatting properties into groups. Each group can be associated with a style and/or direct formatting that is found in the selected text. Thus, the interactive formatting window 304 can display a list of styles with each formatting property associated with that style. The interactive formatting window 304 will also identify which formatting properties are associated with direct formatting. Advantageously, this allows the user to identify which styles and/or direct formatting are affecting the selected text.

The Show All Formatting Marks checkbox 324 can be selected to display all normally-hidden formatting marks. For example, a user can select the Show All Formatting Marks checkbox 324 to display all paragraph marks. Because displaying all formatting marks can make a document look cluttered, the Show All Formatting Marks checkbox 324 will be un-selected as the default condition.

Those skilled in the art will appreciate that various other options could be added to the options window 306 within the scope of the present invention. For example, a Formatting Markers checkbox (not shown) could be provided to allow the user to distinguish between sections of identical formatting. For example a begin marker and an end marker could be used to identify portions of a document that have identical style and/or direct formatting applied thereto. Among other things, this functionality would allow a user to quickly determine whether inconsistent formatting existed within the document.

Figure 4:
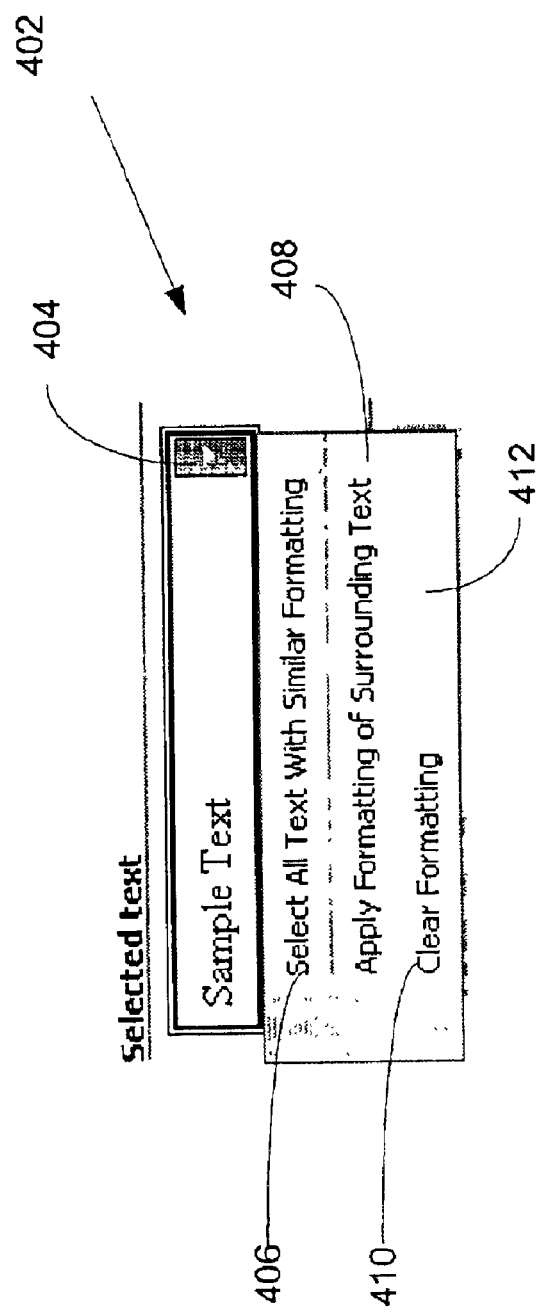
FIG. 4 depicts an alternative embodiment of the selected text window.

FIG. 4 depicts an alternative embodiment of the selected text window 402. In this alternative embodiment, the selected text window is equipped with a drop-down menu 412 that is displayed in response to the selection of a menu button 404. The menu permits the manipulation of the formatting properties of the selected text. Menu element 408 enables the application of the formatting of surrounding text to the selected text. For example, where the formatting properties of the selected text are inconsistent with the formatting properties of surrounding text, the user can select menu element 408 to make the formatting uniform. Alternatively, the user can select menu element 410 to clear the formatting in the selected text. Clearing the formatting in the selected text will change the formatting properties of the selected text to some predefined default formatting property set.

The drop-down menu 412 also includes a search menu element 406. The search menu element 406 will select all text in the document having formatting similar to that of the selected text. This feature allows a user to determine how often the set of formatting properties has been applied throughout the document. Once all similarly formatted text has been selected, the user can modify the formatting properties simultaneously. In an exemplary embodiment of the present invention, the formatting properties that are compared for the purposes of identifying similarly formatted text can be a subset of the complete set of formatting properties. In an alternative embodiment, the user may be permitted to select the formatting properties that are included in this subset.

Figure 5:
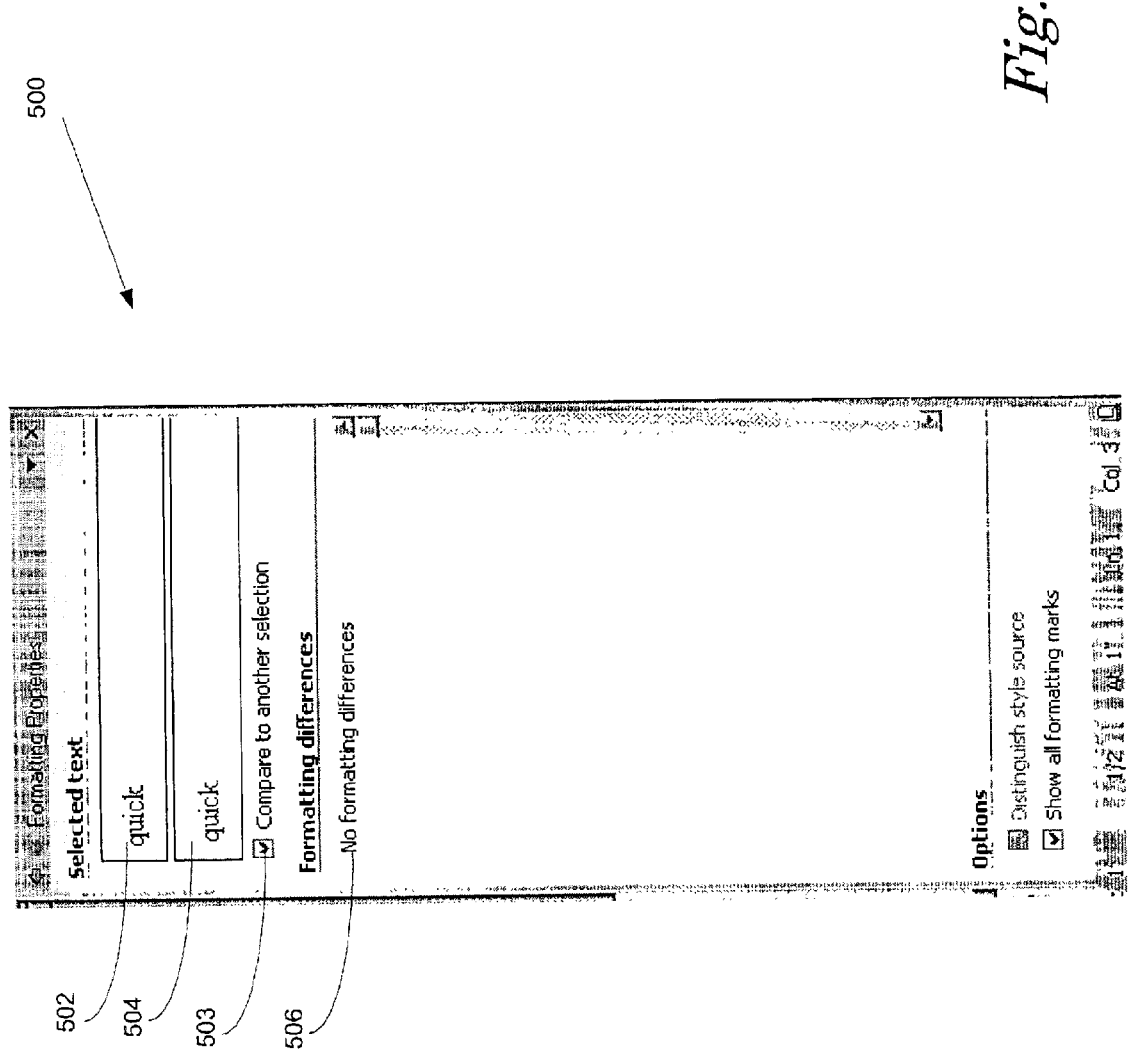
FIG. 5 depicts a formatting comparison pane that is an exemplary embodiment of the present invention.

FIG. 5 depicts a formatting comparison pane 500 that is an exemplary embodiment of the present invention. The formatting comparison pane 500 includes an original selected text window 502 and a comparison selected text window 504. As discussed in connection with FIG. 3, the selected text window 302 includes a Compare checkbox 303 that enables the comparison of the formatting properties of selected text with the formatting properties of a second text selection. As is shown in FIG. 5, the Compare checkbox 503 of the original interactive formatting pane 502 has been checked. Accordingly, the comparison formatting pane 504 is displayed.

When the Compare checkbox 503 is selected, the second selected text window 504 is displayed. In addition, the user can be prompted to select a second portion of the document for comparison.

A formatting differences section 506 is also displayed. In the example of FIG. 5, there are no formatting differences between the original selected text displayed in selected text window 502 and the comparison selected text displayed in the comparison selected text window 504. Accordingly, no formatting differences are displayed in the formatting differences window 506.

Figure 6:
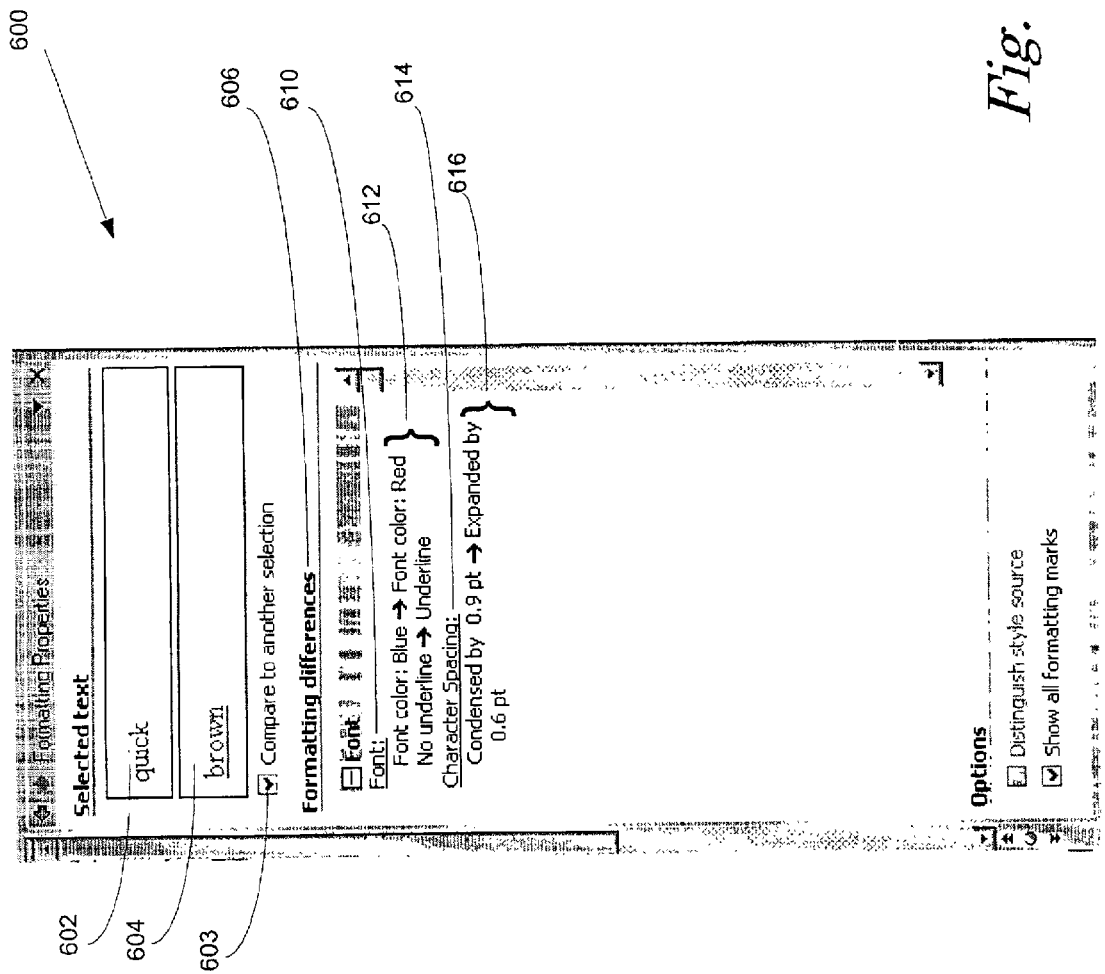
FIG. 6 depicts a formatting comparison pane that includes an original selected text window and a comparison selected text window.

FIG. 6 depicts a formatting comparison pane 600 that includes an original selected text window 602 and a comparison selected text window 604. Because formatting differences exists between the text selections, the formatting differences window 606 displays those differences. In the example of FIG. 6, the differences are limited to the Font category. Specifically, the Font formatting property 610 is associated with differences that have been determined between the original selected text and the comparison selected text. Similarly, the Character Spacing formatting property 614 is associated with Character Spacing formatting differences 616. In the example of FIG. 6, the font color of the original selected text is blue, whereas the font color of the comparison selected text is read. In addition, the original selected text is not underlined while the comparison selected text is underlined. Finally, the original selected text is condensed by 0.9 points, while the comparison selected text is expanded by 0.6 points.

By selecting the Font formatting property 610 or the Character Spacing formatting property 614, the user can change these properties in the original selected text, the comparison selected text, or both. Selecting a formatting characteristic hyperlink will display a formatting modification dialog box (not shown) associated with that hyperlink that will permit the user to make changes to the original selected text and/or the comparison selected text.

The formatting modification dialog box will also allow the user to apply the formatting of the original selection to the comparison selection. This feature is described in more detail in connection with FIG. 7.

Figure 7:
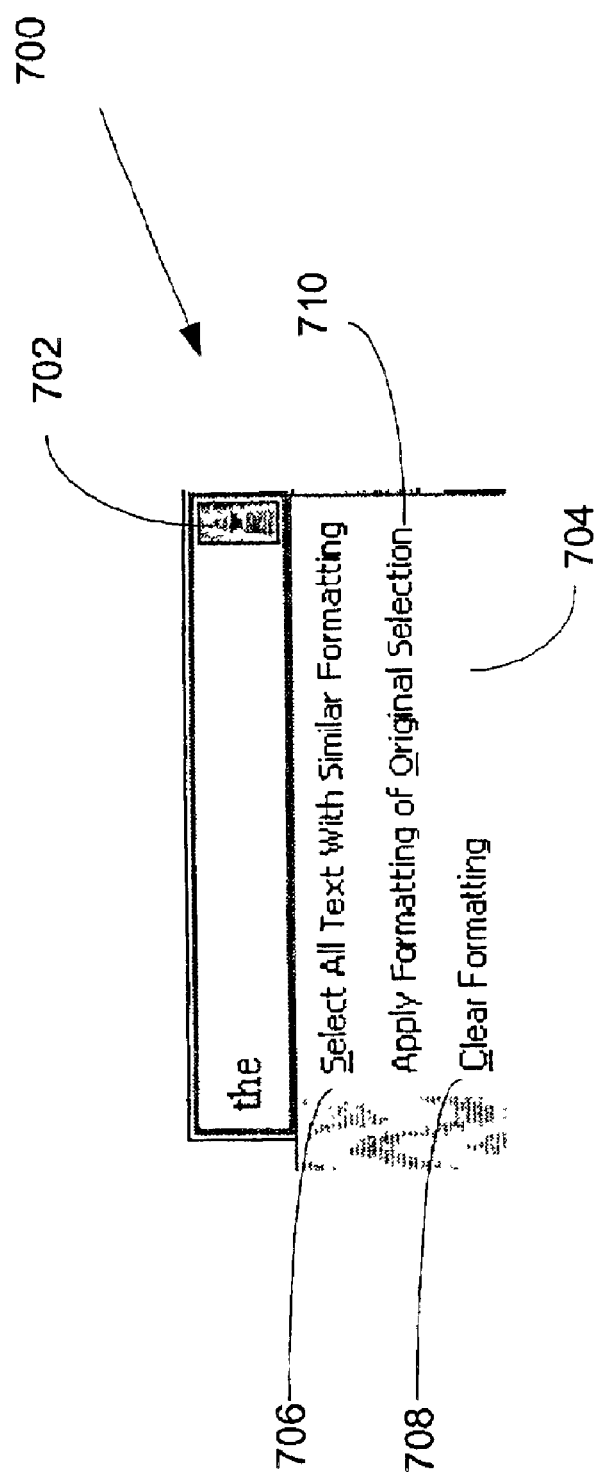
FIG. 7 depicts an alternative embodiment of the comparison selected text window.

Turning now to FIG. 7, an alternative embodiment of the comparison selected text window 604 (FIG. 6) is depicted. As discussed above in connection with FIG. 4, the comparison selected text window 700 can be equipped with a drop down menu 704 that is displayed in response to the selection of menu button 702. As in the example of FIG. 4, the drop down menu 704 can include menu elements for selecting all text having similar formatting 706 and for clearing the formatting in the text selected for comparison to default formatting values (menu elements 708). In addition, the comparison selected text window 700 can also include a menu element for applying the formatting of the original selection to the comparison selection 710. This will apply all for a subset of the formatting properties associated with the original selected text to the comparison selected text. As described above, the subset could be predefined by means of a user preferences setting and/or configuration file.

Figure 8:
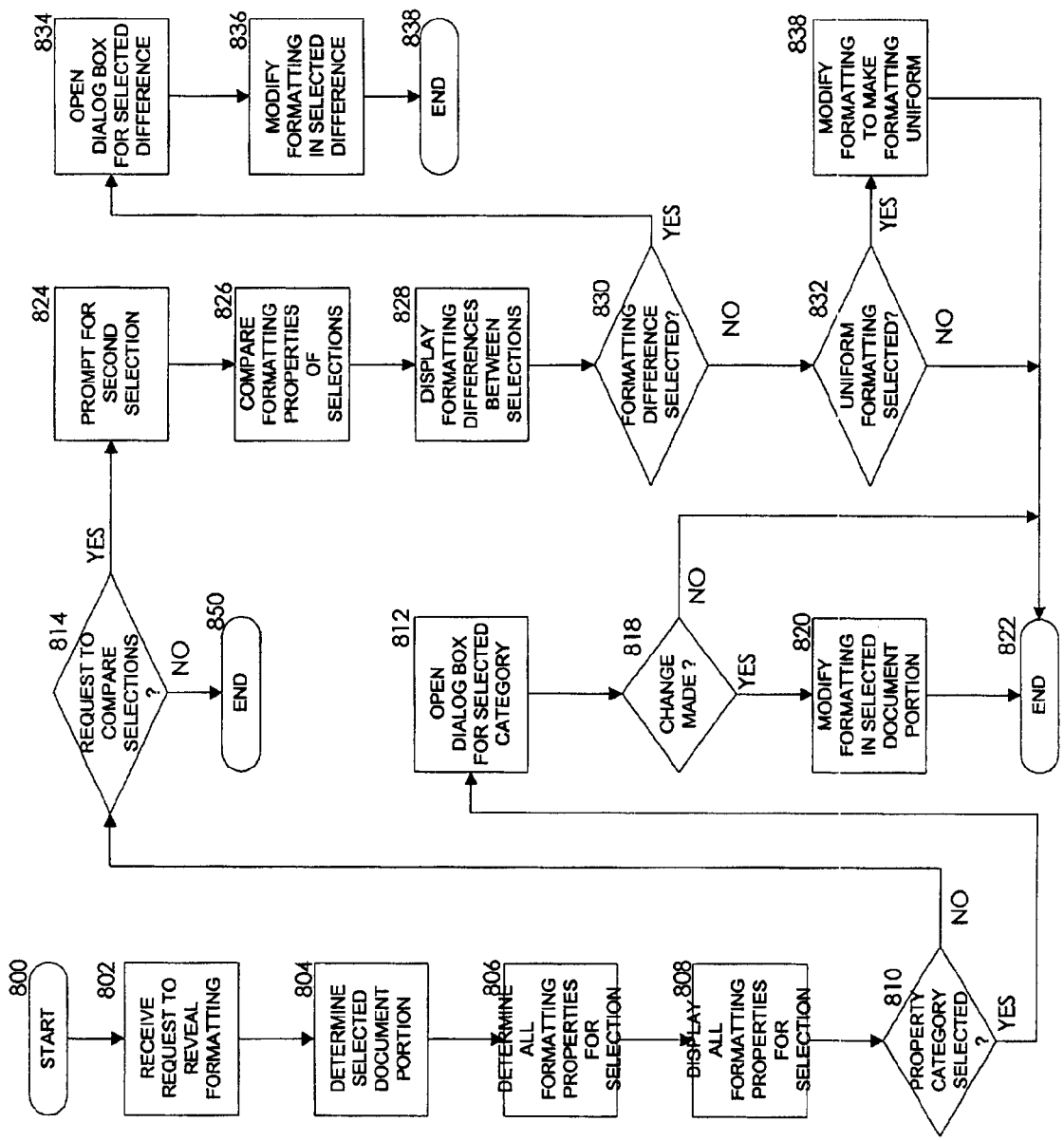
FIG. 8 is a flow chart depicting a method for displaying and modifying text formatting that is an exemplary embodiment of the present invention.

FIG. 8 is a flow chart depicting a method for displaying and modifying text formatting that is an exemplary embodiment of the present invention. The method begins at step 800 and proceeds to step 802. At step 802, a request to reveal formatting was received. As described above, this request could be a user selecting a "reveal formatting" button or could be an automated response to a formatting condition (e.g., a determination that inconsistent formatting exists in a document). The method proceeds from step 802 to step 804. At step 804, a selected portion of the document is determined. This may be done by a user highlighting and selecting portions of the document or may be an automated event. The method proceeds from step 804 to step 806. At step 806 all formatting properties for the selection are determined. The method then proceeds to step 808 and all formatting properties for the selection are displayed.

At decision block 810, a determination is made as to whether a property category has been selected. As described above, the formatting property category could be selected as a hyperlink in an interactive format pane. If a formatting property category has been selected, the method branches to step 812. At step 812, a dialog box is opened corresponding to the selected category. As described above, the dialog box may enable a user to make changes to the selected category. The method then proceeds to decision block 818. At decision block 818, a determination is made as to whether a change has been made in the dialog box. If no change is made, then the method branches to step 822 and ends. If, on the other hand a change is made, the method branches to step 820. At step 820 the formatting of the selected document portion (as well as the text displayed in the selected text window) is modified to reflect the change made in the dialog box. The method then proceeds to step 822.

Returning now to decision block 810, if a determination is made that a property category has not been selected, then the method proceeds to decision block 814. At decision block 814, a determination is made as to whether a request has been made to compare text selections. If no such request has been made the method branches to step 850 and ends. If, on the other hand, a request to compare selections has been made, the method branches from decision block 814 to step 824. At step 824, the user is prompted to select a second (i.e., comparison) portion of the document. The method proceeds to step 826, wherein the formatting properties of the two selected document portions are compared to each other. The method proceeds from step 826 to step 828. At step 828, the formatting differences (if any) between the two selected document portions are displayed. The method then proceeds to decision block 830.

At decision block 830, a determination is made as to whether a formatting difference has been selected. If a formatting difference is selected, then the method branches to step 834. At step 834 a dialog box is opened to enable the user to select changes to the selected document portions. The method proceeds from step 834 to step 836. At step 836 the formatting properties of the selected portion are modified in accordance with the user's instructions made via the dialog box. The method proceeds from step 836 to 838 and ends.

Returning to decision block 830, if a determination is made that a formatting difference has not been selected, the method branches from decision block 830 to decision block 832. At decision block 832, a determination is made as to whether the user has selected uniform formatting for the two, selected document portions. If the user has not selected uniform formatting, the method branches to step 822 and ends. If, on the other hand the user has selected uniform formatting, the method branches to step 838 and the formatting of one or both of the selected document portions are modified to make the formatting uniform. The method then branches to step 822 and ends.

Although the present invention has been described in connection with various exemplary embodiments, those of ordinary skill in the art will understand that many modifications can be made thereto within the scope of the claims that follow. For example, although the embodiments of the present invention have been described in the context of formatting text in a word processor created document, those skilled in the art will appreciate that the invention may be implemented to similarly process any document elements, including, but not limited to, tables, charts, and HTML content. Accordingly, it is not intended that the scope of the invention in any way be limited by the above description, but instead be determined entirely by reference to the claims that follow.

What is claimed is:

1. A computer system for displaying on a computer display device an interactive formatting pane for displaying and modifying a formatting properties set associated with a first text string, comprising:
   a selected text window on the computer display device for displaying the first text string with the formatting properties set applied thereto;
   an interactive formatting window on the computer display device operative to display a formatting property that is a member of the formatting properties set and to enable the formatting property to be modified;
   wherein the formatting properties set is modified; and
   a compare checkbox on the computer display device, the compare checkbox being operative to display a formatting difference between the first text string and a second text string.

2. The computer system of claim 1, wherein the modification of the formatting properties set is operative to modify the first text string displayed in the selected text window.

3. The computer system of claim 1, wherein the interactive formatting window displays every formatting property in the formatting properties set.

4. The computer system of claim 1, wherein the interactive formatting window displays a subset of the formatting properties in the formatting properties set.

5. The computer system of claim 1, wherein the formatting property is displayed as a hyperlink.

6. The computer system of claim 5, wherein the hyperlink is selectable to provide a format modification dialog box.

7. The computer system of claim 6, wherein the format modification dialog box is operative to modify the formatting property.

8. The computer system of claim 1, wherein the formatting difference is displayed as a hyperlink.

9. The computer system of claim 8, wherein the hyperlink is selectable to reconcile the formatting difference.

10. A computer-implemented method for modifying a formatting properties set associated with a first text string, the method comprising the steps of:
    displaying on the computer the first text string with the formatting properties set applied thereto;
    displaying on the computer at least one formatting property that is a member of the formatting properties set;
    providing on the computer a format modification dialog box, in response to the selection of the displayed formatting property;
    wherein the format modification dialog box is operative to modify the formatting properties set; and
    displaying on the computer a compare checkbox, the compare checkbox being selectable to display a formatting difference between the first text string and a second text string.

11. A computer readable medium having stored thereon computer-executable instructions for performing the method of claim 10.

12. The method of claim 10, wherein the at least one formatting property is displayed as a hyperlink.

13. The method of claim 12, wherein the hyperlink is selectable to provide the format modification dialog box.

14. The method of claim 10, wherein the formatting difference is displayed as a hyperlink.

15. The method of claim 14, wherein the hyperlink is selectable to reconcile the formatting difference.

16. A computer-implemented method for comparing a first formatting properties set associated with a first text string and a second formatting properties set associated with a second text string, the method comprising the steps of:

displaying on the computer the first text string with the first formatting properties set applied thereto;

displaying on the computer the second text string with the second formatting properties set applied thereto;

displaying on the computer a formatting difference between the first formatting properties set and the second formatting properties set; and providing on the computer a format modification dialog box, in response to the selection of the displayed formatting difference;

wherein the format modification dialog box is operative to modify the first formatting properties set and to modify the second formatting properties set.

17. A computer readable medium having stored thereon computer-executable instructions for performing the method of claim 16.

18. The method of claim 16, wherein the format modification dialog box includes a selection for reconciling all differences between the first formatting properties set and the second formatting properties set, by setting the second formatting properties set equal to the first formatting properties set.

* * * * *